United States Patent [19]

Carr

[11] Patent Number: 5,142,935
[45] Date of Patent: Sep. 1, 1992

[54] PARKING BRAKE LEVER CABLE RETAINER

[75] Inventor: Clyde E. Carr, Galien, Mich.

[73] Assignee: Allied-Signal Inc., Morristown, N.J.

[21] Appl. No.: 782,858

[22] Filed: Oct. 25, 1991

[51] Int. Cl.$^5$ .............................................. F16C 1/10
[52] U.S. Cl. .................................. 74/502.6; 74/502.4
[58] Field of Search ........................ 74/502.4, 502.6; 188/78, 79, 325

[56] References Cited

U.S. PATENT DOCUMENTS

| | | | |
|---|---|---|---|
| 2,663,384 | 12/1953 | Chamberlain | 188/73 |
| 4,364,284 | 12/1982 | Tani et al. | 74/502.6 X |
| 4,379,500 | 4/1983 | Kamino | 188/196 B |
| 4,400,992 | 8/1983 | Londres | 74/501 R |
| 4,488,831 | 12/1984 | Waite | 403/209 |
| 4,595,084 | 6/1986 | Le Deit | 74/502.4 X |
| 4,635,761 | 1/1987 | Smith et al. | 188/72.6 |
| 4,886,134 | 12/1989 | Yamamoto | 188/20 |
| 4,886,146 | 12/1989 | Copp | 188/2 D |
| 4,932,503 | 6/1990 | Yamamoto | 188/2 D |

FOREIGN PATENT DOCUMENTS 674752  2/1930  France ............................ 74/502.4

Primary Examiner—Rodney H. Bonck
Assistant Examiner—Nicholas Whitelaw
Attorney, Agent, or Firm—Larry J. Palguta; Ken C. Decker

[57] ABSTRACT

The parking brake lever cable retainer (90) comprises a wire form spring retainer (90) attached to a parking brake lever (40) in order to couple a cable (50) and cable ball (82) with the end of the lever (40). The lever (40) includes a pair of spaced-apart end feet (44, 45) with a longitudinal recess (46) extending therebetween such that the cable (50) is disposed within the longitudinal recess (46) and extends from one side (41) of the lever (40) to the opposite side (43) where the cable ball (82) is received within complementary-shaped openings (42) in each of the feet (44, 45). The wire form spring retainer (90) comprises a pair of arc-shaped resilient legs (91, 93) extending laterally across the lever (40) from free ends (91A, 93A) exerting opposite forces (D, E) against engagement slots (49) at the opposite side (43) of the lever (40), and at the one side (41) of the lever (40) the legs (91, 93) form a looped, generally circular-shaped portion (98) that engages the cable ball (82) and biass the cable ball (82) into the complementary-shaped openings (42). The cable (50) is free to travel downwardly as it pivots about the cable ball (82).

8 Claims, 2 Drawing Sheets

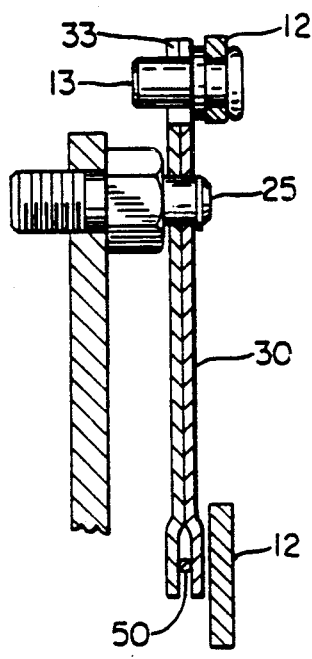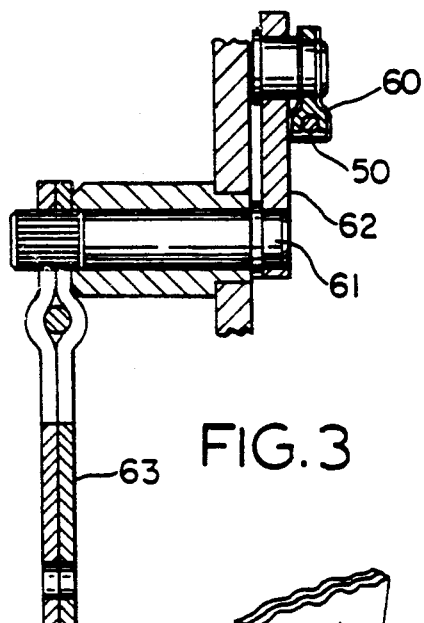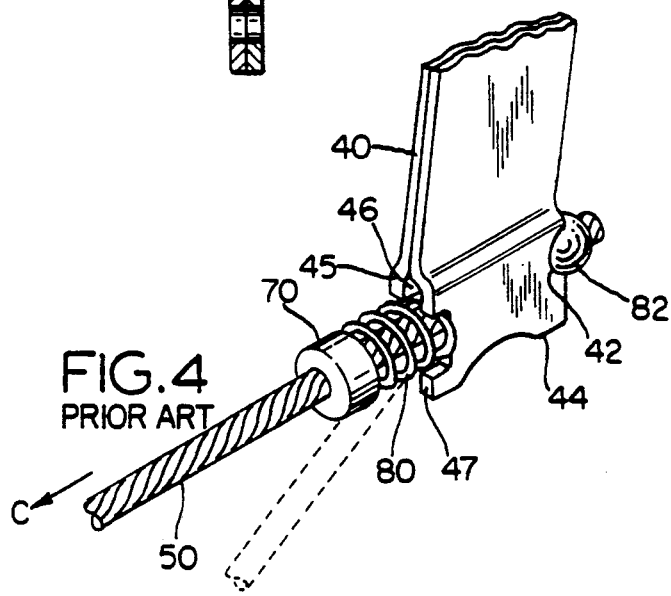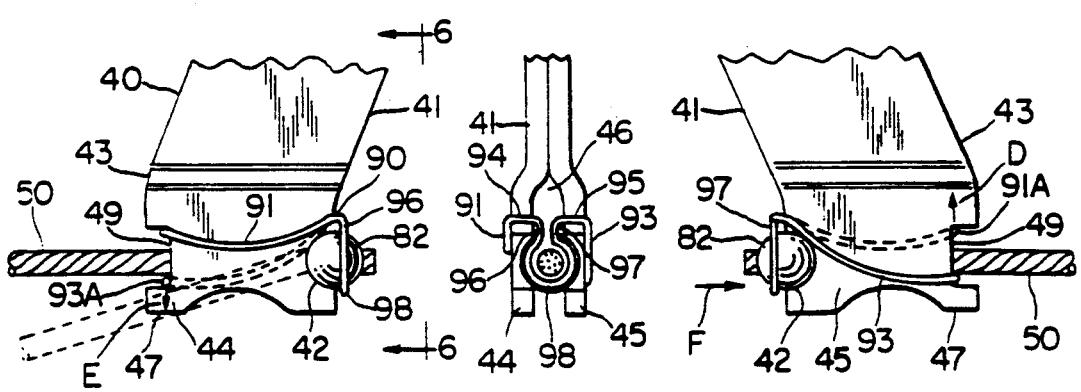
FIG.2
FIG.3
FIG.4 PRIOR ART
FIG.5    FIG.6    FIG.7

PARKING BRAKE LEVER CABLE RETAINER

The invention relates generally to a cable retainer for a parking brake lever, and in particular to a cable retainer which allows the cable to move freely without experiencing damage thereto.

Many drum brakes typically include a parking brake lever which is actuated by a movable cable attached to an end of the parking brake lever. Numerous mechanisms have been provided for attaching the cable to the end of the parking brake lever, and one mechanism comprises a ball at the end of the cable which is seated within a complementary-shaped opening of the lever, and a spring and spacer member located about the cable and engaging the opposite side of the lever in order to keep the ball seated within the complementary-shaped opening of the lever. During normal operation, the lever and cable retainer operate in an acceptable manner. However, should the brake shoes of the associated drum brake not be in close adjustment relative to the drum, such that there is an excess clearance between the drum brake shoes and drum, then the relatively large displacement of the lever by the cable can cause the spring disposed about the cable to be forced down into an opening between axially spaced-apart feet at the end of the lever. The spring subsequently becomes deformed and portions of the spring may break off such that the size and biasing force of the spring is substantially reduced and the ball may disengage from the complementary-shaped opening whereby the cable becomes detached from the end of the lever. Additionally, the cable rubs against the deformed spring over an extended period of time and may experience fretting and breaking.

It is highly desirable to provide a parking brake lever cable retainer which effectively couples the parking cable to the lever so that the cable is free to move downwardly between the axially spaced-apart feet during large adjustments of the brake shoes and not cause damage to the mechanism which attaches the cable to the lever. The attachment mechanism or retainer should require a minimal number of parts, operate efficiently, not be subject to fatigue so that replacement is not required during the wear life of the drum brake shoes, and should operate effectively to retain the retaining ball of the cable in engagement with the lever.

The present invention provides solutions to the above problems by providing a brake lever cable retainer for a brake actuated by movement of a brake lever, the brake lever comprising at one end a longitudinal recess extending between a pair of spaced apart feet, the longitudinal recess extending from one side to an opposite side of said lever so that a cable may pass therethrough, one side of the lever having means for engaging an abutment end of said cable, a cable disposed within said longitudinal recess so as to extend from one side to the opposite side of said lever and having the abutment end thereof received within the engaging means, and a retainer for coupling said cable and abutment end with said lever, the retainer comprising a pair of spaced-apart legs extending across said lever from one side to the opposite side and located at respective front and rear sides of said lever, an end engagement portion extending along said one side of the lever to engage said end abutment of the cable, free ends of said legs each engaging the opposite side of said lever in order to bias said abutment end into engagement with said engagement means, and the free ends of said legs engaging and biasing said lever in opposite directions such that the retainer is stabilized relative to the lever and the abutment end is held in contact with the engagement means.

One way of carrying out the invention is described in detail below with reference to the drawings which illustrate a in which:

FIG. 2 is a section view taken along view line 2—2 of FIG. 1;

FIG. 3 is a section view taken along view line 3—3 of FIG. 1;

FIG. 4 is an isometric illustration of a prior cable retainer mechanism;

FIG. 5 is an illustration of the parking brake lever and cable retainer in accordance with the present invention and as in FIG. 1;

FIG. 6 is an end view taken along view line 6—6 of FIG. 5; and

FIG. 7 is a rear view of the parking brake lever and cable retainer illustrated in FIG. 5.

Figure 1:
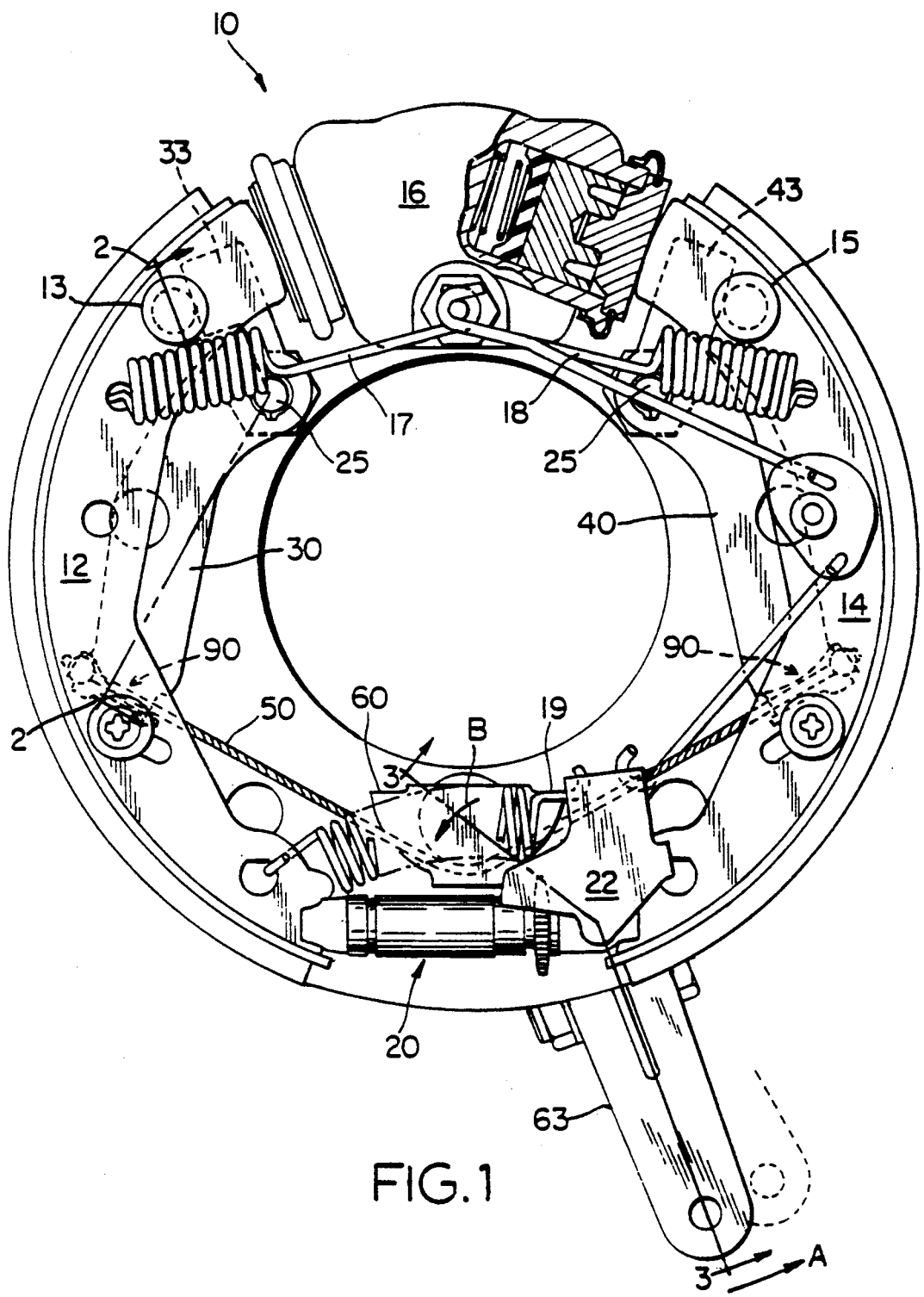
FIG. 1 is a view of a duo servo drum brake utilizing therein the present invention.

FIG. 1 is an illustration of a duo servo drum brake designated generally by reference numeral 10 and including therein the present invention. Drum brake 10 includes drum brake shoes 12 and 14 which are biased circumferentially outwardly into engagement with a rotating drum (not shown) by dual hydraulic wheel cylinder 16. An opposite end of shoes 12, 14 includes a star wheel adjuster mechanism designated generally by reference numeral 20 which is operated by rotatable pawl 22. Drum brake shoes 12 and 14 are biased toward an at-rest position by springs 17, 18 and 19. Located on each lateral side of brake 10 are parking brake levers 30 and 40. Parking brake levers 30 and 40 are identical in form but are mounted oppositely on opposite sides of the brake. Cable 50 engages an end of each of parking brake levers 30 and 40, and spans across parking brake retainer mechanism 60 attached to actuating lever 62 operated by exterior lever 63 (see FIG. 3). Each of the parking brake levers 30 and 40 is mounted via pivot pin 25 (see FIG. 2) such that parking brake lever end extension 33 or 43 engages associated brake shoe pin 13 or 15 in order, during operation, to bias the respective brake shoe 12 or 14 into engagement with the not shown drum.

Referring to FIG. 1, actuating lever 63 is displaced in the direction of Arrow A by a not shown parking brake cable which causes lever 63 to rotate pin 61 (FIG. 3) that causes actuating lever 62 to move downwardly in the direction of Arrow B in FIG. 1. As actuating lever 62 moves downwardly, parking brake retainer mechanism 60 moves in the direction of Arrow B in FIG. 1 and causes cable 50 spanning between parking brake levers 30, 40 to move downwardly such that the respective ends of the parking brake levers 30, 40 move toward the interior of the brake and pivot the levers about the pins 25 such that end extensions 33 and 43 bias pins 13, 15 radially outwardly and bring the drum brake shoes into engagement with the drum.

Referring now to FIG. 4, a prior cable retainer for a parking brake lever of brake 10 is illustrated. The prior design utilized a spacer 70 attached to cable 50 in order to cause spring 80 to bias the cable in the direction of Arrow C and cause cable ball 82 to engage complementary-shaped opening 42 of parking brake lever 40. Lever 40 includes a pair of axially spaced-apart end feet 44, 45 disposed about longitudinal recess 46 which extends from one lateral side of lever 40 to the opposite lateral side of lever 40 so that cable 50 may be disposed therethrough. During operation of the brake, the movement of the cable via rotating lever 63 would cause parking brake lever 40 to be displaced and effect an appropriate operational movement of the respective brake shoe. However, when the brake shoes are not in close adjustment such that there is an excess clearance between the friction material of the brake shoes and the drum, then the cable and parking brake levers 30 and 40 would experience a much larger displacement such that, in the prior design, spring 80 would be forced downwardly (with the dotted line position of the cable) in longitudinal recess 46 between the bottom 47 of feet 44, 45 as the cable is displaced downwardly by the pivoted actuating lever 62. Thus, spring 80 would be forced into the bottom of longitudinal recess 46 and between the feet bottoms 47 such that some of the spring coils would become deformed, some coils would break off and cause a reduction in the length of the spring and its biasing force, and possibly result in cable ball 82 being displaced from opening 42 and disengage the cable from the lever. Additionally, cable 50 would rub on spring 80 to the extent that cable would fret and occasionally break. The present invention comprising a cable retainer for a parking brake lever is provided in order to eliminate the problems experienced in the previous design.

Referring to FIGS. 5 and 6, parking brake lever 40 receives cable 50 within longitudinal recess 46 whereby cable 50 extends from one side of lever 40 to the opposite side of the lever where cable ball 82 is received within complementary-shaped opening 42. The previously utilized spacer 70 and spring 80 have been eliminated and wire form spring retainer 90 is provided in order to couple ball 82 and cable 50 with lever 40. Lever 40 includes at one lateral side 41 a pair of the complementary-shaped openings 42 and at the opposite lateral side 43 a pair of engagement slots 49 in feet 44, 45. Wire form spring retainer 90 comprises a pair of spaced-apart arc-shaped legs 91 and 93 on the front and rear sides of the lever and which terminate in free ends 91A and 93A that are not aligned with one another in the respective slots 49. Legs 91 and 93 (see FIG. 6) extend into respective axially inwardly extending portions 94 and 95 which then extend through curved portions 96 and 97 to a generally circular shaped portion 98 that engages cable ball 82. Retainer 90 is snapped onto the lever 40 and cable ball 82. Wire form spring retainer 90 exerts several resilient forces against the lever and cable ball 82 in order to maintain the coupling therebetween. As illustrated in FIG. 7, free end or foot 91A exerts a force D against the upper end of slot 49 while the free end or foot 93A (FIG. 5) exerts a downward force E against the bottom of the respective slot 49. These oppositely exerted forces, caused by the spring feet being seated resiliently within the respective slots 49, effect a stabilization of spring 90 relative to lever 40. Additionally, generally circular shaped portion 98 exerts a laterally directed biasing force F (FIG. 7) against cable ball 82 to maintain it in engagement with the complementary-shaped openings 42. Additionally, the generally annular shaped portion 98 may, if desired, also exert radially inward reaction forces on ball 82 as a result of curved portions 96, 97 being biased away from one another as ball 82 engages circular portion 98.

As illustrated in FIG. 5 by the dotted line position of cable 50, the cable is free to move downwardly in longitudinal recess 46 between the bottoms 47 of feet 44, 45 without engaging anything that would wear or deteriorate the condition of the cable. Additionally, spring 80 used in the previous design (see FIG. 4) has been eliminated so that the cable retention forces are exerted directly against cable ball 82 which may pivot within the complementary-shaped openings 42 without damage to the cable. The cable retainer of the present invention eliminates the previously used spacer 70 and spring 80 while providing a wire form cable retainer 90 which operates efficiently and provides an extended wear life, all without any detrimental effects upon cable 50 and cable ball 82. Wire form spring retainer 90 is utilized on both parking brake levers 30, 40 as illustrated in FIG. 1.

I claim:

1. A brake lever cable retainer for a brake actuated by movement of a brake lever, the brake lever comprising at one end a longitudinal recess extending between a pair of spaced apart feet, the longitudinal recess extending from one side to an opposite side of said lever so that a cable may pass therethrough, one side of the lever having means for engaging an abutment end of said cable, the cable disposed within said longitudinal recess so as to extend from one side to the opposite side of said lever and having the abutment end thereof received within the engaging means, and the retainer for coupling said cable and abutment end with said lever, the retainer comprising a pair of spaced-apart legs extending across said lever from one side to the opposite side and located at respective front and rear sides of said lever, an end engagement portion extending along said one side of the lever to engage said end abutment of the cable, free ends of said legs each engaging the opposite side of said lever in order to bias said abutment end into engagement with said engagement means, and the free ends of said legs engaging and biasing said lever in opposite directions such that the retainer is stabilized relative to the lever and the abutment end is held in contact with the engagement means.

2. The retainer and lever in accordance with claim 1, wherein each of the legs includes an arc shape which effects said opposite biasing force of the free ends.

3. The retainer and lever in accordance with claim 2, wherein said end engagement portion of the retainer includes a generally annular loop member which engages the abutment end.

4. The retainer and lever in accordance with claim 3, wherein the abutment end comprises a ball member attached to said cable.

5. The retainer and lever in accordance with claim 4, wherein the end engagement portion of the retainer comprises the legs extending axially toward one another and each extending in a curved direction in order to form said loop member.

6. The retainer and lever in accordance with claim 5, wherein the end engagement portion is disposed substantially perpendicular relative to a longitudinal axis of the cable in an at-rest position of the lever.

7. The retainer and lever in accordance with claim 5, wherein the free ends of the legs each engage a respective foot and are axially spaced-apart at the recess so that the cable is free to move downwardly and out of said recess.

8. The retainer and lever in accordance with claim 1, wherein the retainer comprises a wire form retainer that is snapped onto the lever and abutment end of the cable.

* * * * *